(12) United States Patent
Strand et al.

(10) Patent No.: US 11,184,759 B1
(45) Date of Patent: Nov. 23, 2021

(54) CONTROLLING DATA PATHS WITHIN CELLULAR TELECOMMUNICATIONS ENVIRONMENTS

(71) Applicant: Expeto Wireless Inc., Vancouver (CA)

(72) Inventors: Terje Strand, San Francisco, CA (US); Brian Anderson, Vancouver (CA)

(73) Assignee: Expeto Wireless Inc., Vancouver (CA)

(*) Notice: Subject to any disclaimer, the term of this patent is extended or adjusted under 35 U.S.C. 154(b) by 0 days.

(21) Appl. No.: 16/879,671

(22) Filed: May 20, 2020

(51) Int. Cl.
| | |
|---|---|
| *H04W 8/18* | (2009.01) |
| *H04W 88/16* | (2009.01) |
| *H04W 88/06* | (2009.01) |
| *H04W 48/18* | (2009.01) |
| *H04L 12/725* | (2013.01) |
| *H04W 40/24* | (2009.01) |
| *H04W 4/60* | (2018.01) |

(52) U.S. Cl.
CPC ............ *H04W 8/18* (2013.01); *H04L 45/308* (2013.01); *H04W 4/60* (2018.02); *H04W 40/248* (2013.01); *H04W 48/18* (2013.01); *H04W 88/06* (2013.01); *H04W 88/16* (2013.01)

(58) Field of Classification Search
CPC ....... H04W 8/18; H04W 88/16; H04W 88/06; H04W 40/248; H04W 4/60; H04W 48/18; H04L 45/308
See application file for complete search history.

(56) References Cited

U.S. PATENT DOCUMENTS

| | | | |
|---|---|---|---|
| 2018/0063731 A1 | 3/2018 | Ashrafi | |
| 2019/0268230 A1* | 8/2019 | Huang | ................ H04L 41/0893 |
| 2019/0320384 A1* | 10/2019 | Tillgren | ................ H04W 64/00 |

FOREIGN PATENT DOCUMENTS

EP           2816774        12/2014

OTHER PUBLICATIONS

International Search Report and Written Opinion, International Application No. PCT/US2021/033229, 13 pages, dated Sep. 15, 2021.
Xia Wenfeng et al., "A Survey on Software-Defined Networking," *IEEE Communications Surveys & Tutorials*, vol. 17, No. 1, pp. 27-51, Jan. 1, 2015.

* cited by examiner

*Primary Examiner* — Charles C Jiang
*Assistant Examiner* — Shawn D Miller
(74) *Attorney, Agent, or Firm* — Klarquist Sparkman, LLP (57) ABSTRACT

Technologies are described for controlling the data path (e.g., the end-to-end data path) for cellular network data. For example, a customer of a cellular network that owns or operates cellular devices can use the technologies described herein to control how cellular network data travels through the cellular network, including associated network connections and network equipment, before ultimately reaching the customer's network. In some implementations, the data path is controlled at each of a plurality of stages. For example, control can be applied at the mobile operator stage (e.g., to control which mobile operator the cellular device connects to), at the home subscriber server (HSS) stage, at the proxy stage, and/or at the packet data network gateway (PGW) stage.

20 Claims, 5 Drawing Sheets

CONTROLLING DATA PATHS WITHIN CELLULAR TELECOMMUNICATIONS ENVIRONMENTS

BACKGROUND

Organizations that manage cellular devices want to be able to manage how those cellular devices connect to available cellular networks and how the cellular devices' data travels through the cellular networks. In existing solutions, the organization can configure a cellular device with a specific IMSI or configure eSIM profiles to manage the cellular device's identity. This will influence which cellular network the cellular device can connect to (e.g., by providing a preferred order, such as trying a home network first and then falling back to roaming networks if available). The cellular device can also be prevented from connecting to specific cellular networks.

However, this ability to manage which cellular network the cellular device connects to is limited in its ability to control the data path of the cellular device (e.g., through the cellular network environment). For example, it may not be possible for the organization to prevent a cellular device from connecting to specific entities within the cellular network environment (e.g., entities located in specific countries). The organization may also not be able to control which entities the data path traverses or which countries the data path may, or may not, enter.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for controlling the data path (e.g., the end-to-end data path) for cellular network data. For example, a customer of a cellular network that owns or operates cellular devices can use the technologies described herein to control how cellular network data travels through the cellular network, including associated network connections and network equipment, before ultimately reaching the customer's network. In some implementations, the data path is controlled at each of a plurality of stages. For example, control can be applied at the mobile operator stage (e.g., to control which mobile operator the cellular device connects to), at the home subscriber server (HSS) stage, at the proxy stage, and/or at the packet data network gateway (PGW) stage.

DETAILED DESCRIPTION

Overview

The following description is directed to technologies for controlling the data path (e.g., the end-to-end data path) for cellular network data. For example, a customer of a cellular network that owns or operates cellular devices can use the technologies described herein to control how cellular network data travels through the cellular network, including associated network connections and network equipment, before ultimately reaching the customer's network. In some implementations, the data path is controlled at each of a plurality of stages. For example, control can be applied at the mobile operator stage (e.g., to control which mobile operator the cellular device connects to), at the home subscriber server (HSS) stage, at the proxy stage, and/or at the packet data network gateway (PGW) stage.

For example, data path control can be implemented according to a policy (e.g., a policy defined by the customer that indicates how the customer's cellular network traffic is allowed to travel through the cellular telecommunications network). In some implementations, the policy comprises indications of allowed and/or disallowed countries, indications of allowed and/or disallowed mobile operators, and indications of allowed and/or disallowed data paths. The policy can be translated (e.g., by a command and control service) to generate configuration updates that will be applied to the various entities involved in the data path. For example, configuration updates can be determined for, and sent to, SIMs, HSSs, proxies, and/or PGWs. The configuration updates can then be applied by the various entities. For example, cellular devices can receive the configuration updates to configure their SIMs, which will then implement the policy. HSSs, proxies, and/or PGWs can similarly receive and apply the configuration updates.

The technologies described herein can be used to control the end-to-end data path from a cellular device to a customer network (and in some implementations to destinations on the Internet and/or other networks reachable via the customer network). The customer network is also referred to as the enterprise network. In some implementations, the end-to-end data path comprises data path portions (also referred to as data path segments) between a cellular device and a mobile operator, between the mobile operator and an IP exchange (IPX), between the IPX and an HSS and/or proxy (e.g., between the IPX and a point of presence (POP) entity comprising the HSS and/or proxy), between the HSS and/or proxy and a PGW (e.g., which may be located within a customer network or connected to the customer network), and between the PGW and the customer network. In some implementations, the data path is also controlled from the PGW to the Internet and/or other networks outside the customer network. Controlling the data path can comprise controlling the signaling path (e.g., the control plane data path) and/or the user plane path (e.g., the data plane data path).

A customer (e.g., an enterprise business or organization) can use the data path control technologies to control the data path at each (e.g., one or more, or every) stage between a given cellular device and the customer's network. For example, the customer can define a policy that controls where the data path can (and cannot) travel through (e.g., allowed and/or disallowed countries, mobile operators, POP locations, customer networks, etc.). For example, if the customer is in a regulated industry, the customer can enforce a specific policy for the customer's cellular data (e.g., to ensure that the customer's data never leaves a particular country, such as the U.S.).

A customer may want to control the customer's cellular devices, including controlling how the customer's devices connect to available cellular networks and how the cellular devices' data travels through the cellular networks. In existing solutions, the customer can configure a cellular device with a specific IMSI or configure eSIM profiles to manage the cellular device's identity. This will influence which cellular network the cellular device can connect to (e.g., by providing a preferred order, such as trying a home network first and then falling back to roaming networks if available). The cellular device can also be prevented from connecting to specific cellular networks. However, this ability to manage which cellular network the cellular device connects to is limited in its ability to control the end-to-end data path. For example, it may not be possible for the customer to prevent a cellular device from connecting to a specific HSS, a specific proxy, or a specific PGW. The customer may also not be able to prevent the data path of a cellular device from traversing entities (e.g., HSS, proxy, PGW, and/or other entities) located in specific countries. The customer may also not have control over which countries the data path is allowed (and not allowed) to enter.

The technologies described herein provide advantages over previous solutions. For example, a customer can control the data path throughout the cellular network environment (e.g., the end-to-end data path from the cellular device to at least the customer's network). The customer can control which entities the data path can (and cannot) travel through, including HSSs, proxies, PGWs, and/or other entities. The customer an also control the geographical locations (e.g., countries, continents, etc.) the data path can (and cannot) travel through.

Cellular Operator Selection Stage

The technologies described herein can be used to control which cellular network the cellular device will connect to. For example, a cellular device (e.g., a smart phone) can have the ability to connect to a number (e.g., two or more) of different cellular networks of different cellular operators. As an example, the cellular device may have the option to connect to an AT&T® cellular network, to a T-Mobile® cellular network, and/or to other cellular networks.

In some implementations, the cellular device changes its international mobile subscriber identity (IMSI) in order to control which cellular operator the mobile device connects to. For example, the cellular device can select the specific IMSI to use (e.g., from a list of available IMSI numbers that are associated with respective different cellular operators) depending on which cellular operator is available (e.g., select a specific IMSI when the cellular device detects that a China Telecom® cellular network is available). The cellular device can select the particular IMSI based on a policy (e.g., to allow particular cellular operators, to disallow particular cellular operators, to prefer particular cellular operators over others, etc.).

In some implementations, the cellular device is controlled via a multi-profile subscriber identity module (SIM), such as an embedded-SIM (eSIM) and/or embedded universal integrated circuit card (eUICC). For example, using one or more of these multi-profile technologies can allow the cellular device to switch its IMSI in order to connect to a selected cellular operator.

The cellular device can also connect to a cellular operator (e.g., regardless of whether the cellular operator is associated with the IMSI currently used by the cellular device). For example, when the cellular device is roaming, it can attempt to connect to cellular operators in a specific order (e.g., in a pre-configured order of preference), which can be based on a policy.

One or more of the following techniques can be used to control which cellular network the cellular device will connect to:

Change the cellular device's IMSI selection algorithm and parameters

Add and/or remove IMSIs

Switch the eSIM profile

Add and/or remove eSim profiles

Configuration of public land mobile network (PLMN) list and forbidden PLMN (FPLMN) lists In some implementations, the cellular device is managed after it is deployed. For example, another entity of the cellular network (e.g., the HSS or the command and control service) can manage the cellular device. For example, the entity can instruct the cellular device to change its IMSI (e.g., upon detecting that the cellular device is trying to connect via a particular mobile operator). The entity can also send configuration updates to the cellular device (e.g., send updates to add/remove/update eSIM profiles). Such control can be performed mid-session (e.g., the entity can detect a change in policy and disconnect the cellular device mid-session).

HSS Stage

In the technologies described herein, the home subscriber server (HSS) (e.g., comprising the home location register (HLR)) can be used to control the data path. At this stage, the inbound (from the cellular device) signaling path can be controlled via the HSS. For example, when the cellular device is attempting to authenticate with the HSS, IMSI steering can be performed to influence which cellular operator the cellular device will use. IMSI steering can include disallowing one or more specific cellular operators, preferring one or more specific cellular operators, and/or performing other steering operations. In some cases, IMSI steering is used to enforce a policy (e.g., to reject initial connection attempts for a specific cellular operator so that the cellular device will try to connect other cellular operators first, and if the cellular device fails to connect to the other cellular operators the HSS can accept the connection).

Management of the data path by the HSS can also be controlled after the cellular device has authenticated. For example, the cellular device can be disconnected mid-session (e.g., by sending a cancel operation to the cellular device).

Management at the HSS can also control the data path by controlling which POP the cellular device connects to. For example, if the cellular device is attempting to authenticate with a specific HSS associated with a specific POP (e.g., a specific POP that serves a specific cellular operator and that is located in a specific geographical location), the authentication request can be approved (e.g., to allow the cellular device to use the data path through the specific cellular operator) or denied (e.g., to prevent the cellular device from using the data path through the specific cellular operator). This control can also be used to control which country or other geographical region the cellular device's data path travels through. For example if an HSS in a specific country receives a connection request, and the specific country should not be allowed in the data path (e.g., as configured by a policy), then the HSS can refuse the connection or change the cellular device's IMSI so that the cellular device connects to a different HSS (e.g., to a different POP in another country) and/or to a different cellular operator (e.g., that will route to a different POP in a different country).

Proxy Stage

In the technologies described herein, the data path can be controlled at the proxy stage. At the proxy stage, the cellular device is attached to the cellular network (e.g., the cellular device has authenticated with the HSS). For example, the proxy stage can begin when the cellular device has completed its signaling (e.g., including authentication) with the HSS, and the cellular device has now requested an Internet Protocol (IP) address to begin a data session (e.g., to communicate with a web server, email server, etc.). This request is received by the proxy, and the proxy can make a number of decisions about how the data session is established and where it is routed. For example, the proxy can control how the data session is routed (the data path for the data session) to the PGW (the outbound data path), including determining which PGW to use for the data session. For example, a customer may operate a number of different customer networks, such as different enterprise cloud environments (e.g., in different geographical locations, such as in different countries), each with its own PGW. The proxy can determine to use a data path to a specific PGW in a specific country (e.g., to avoid countries that are not allowed via a policy).

The proxy can determine which PGW to use based on various criteria (e.g., based on various types of metadata). In some implementations, one or more of the following types of metadata can be used by the proxy.

Country (e.g., which country the cellular device is in, which can be based on the cellular operator, cell tower, and/or other information indicating location of the cellular device)

Cellular operator and/or RAN (e.g., the specific cellular operator and/or RAN that the cellular device is connecting through)

Location (e.g., which cell tower the cellular device is connected to)

Radio type (e.g., whether the cellular device is using 3G, 4G, etc.)

Device type (e.g., determined by the cellular device's International Mobile Equipment Identity (IMEI)

Access point name (APN)

Static subscriber data

The proxy can control the inbound data path. For example, the proxy can deny the inbound data flow (e.g., based on a disallowed cellular operator). For example, if a proxy in a specific country receives a request to start a data session, and the specific country should not be allowed in the data path (e.g., as configured by a policy), then the proxy can refuse to establish the data session. The proxy can also perform other actions, such as reporting, based on the inbound data flow.

The proxy is a custom entity that is not defined by the cellular specifications (e.g., not defined by the cellular specifications (e.g., not defined by the 3GPP specification). In some implementations, the proxy acts as a middleman between the serving gateway (SGW) and the PGW. For example, from the SGW point of view, the proxy can behave has a PGW and be perceived (e.g., by the SGW) as the actual endpoint. From the PGW point of view, the proxy can behave as a SGW. In some implementations, the proxy supports two modes of operation: 1) proxy mode where the traffic is traversed through the proxy and the PGW is totally unaware of the original SGW, or, 2) redirect mode where the traffic is redirected by the proxy to the end PGW. In this latter mode, only the first initial messages per session are traversed through the proxy; all subsequent messages and data go directly between the PGW and the SGW. The proxy can therefore make one of three decisions: deny, allow to a local PGW (proxy or redirect), or, redirect to another proxy in another geographic location. For example, consider a policy that indicates traffic from operator A in country B may not traverse country C, and traffic from A hits the proxy in country C. In this example, the proxy may attempt to redirect to a proxy in country D to satisfy the policy PGW Stage In the technologies described herein, the data path can be controlled at the PGW stage. At the PGW stage, the cellular device is attached to the cellular network (e.g., the cellular device has authenticated with the HSS) and a data session has been initiated with a specific PGW. Typically, the PGW first assigns an IP address to the cellular device. The PGW can route network data received from the cellular device to another network (e.g., to the Internet, to a local network of the customer, etc.), and route network data back to the cellular device.

The PGW can perform various operations to enforce the inbound data path between the PGW and the cellular device. For example, the PGW can determine if the proxy being used in the inbound data path (the proxy through which the inbound data path is traveling) is the correct proxy (e.g., by checking a policy or other configuration information). If the proxy is not correct (e.g., if the proxy is not the authorized proxy, or one of the authorized proxies, for a specific cellular device), then the PGW can terminate the connection or take some other action (e.g., alert an administrator).

In some implementations, the PGW can also enforce the outbound data path (from the PGW to other IP networks, such as destinations in the customer's network and/or the Internet). For example, the PGW can check outbound connections based on characteristics of the cellular device (e.g., the type of cellular device, which can be determined by the IMEI) and make outbound data path decisions accordingly. For example, if the PGW determines that the cellular device is a particular type of IoT device (e.g., a particular type of water sensor), then the PGW can restrict IP connections (e.g., only allow connections to specific destination devices), which can prevent the particular type of IoT device from accessing other Internet sites for example (e.g., to prevent the particular type of IoT device from accessing a search engine, a host in another country, etc.).

The PGW can also provide IP security and networking services, such as firewall services, network address translation (NAT) services, deep packet inspection services, etc. The PGW can also provide additional network routing functionality, such as supporting routing to a subnet accessed via the cellular device (e.g., which can be placed into bridge mode).

The PGW can also perform monitoring and reporting functions. For example, the PGW can monitor the inbound data path and/or the outbound data path and report (e.g., log data, send alerts, etc.) based on various criteria (e.g., alert if a policy restricting access to certain destinations is violated).

The PGW can also enforce network traffic payloads. For example, a policy can be established to restrict particular types of payloads. For example, the policy can restrict payloads based on destination addresses and/or ports. For example, the policy can deny traffic other than SSH and HTTPS traffic based on ports. As another example, the policy can deny all non-encrypted traffic.

Policies

In the technologies described herein, data paths can be controlled using policies. In some implementations, policies comprise indications of allowed (e.g., via whitelists) and/or disallowed (e.g., via blacklists) countries. For example, the policy could indicate that the data path (e.g., for one or more identified cellular devices) is allowed to travel through the U.S., but not China.

In some implementations, policies comprise indications of allowed and/or disallowed mobile operators. For example, the policy could indicate that the data path (e.g., for one or more identified cellular devices) can use AT&T or T-Mobile, but not Deutsche Telekom®.

In some implementations, policies comprise indications of allowed and/or disallowed data paths. For example, the policy could indicate that the data path for a specific customer's cellular devices cannot go through the customer's Singapore POP if the cellular device is located outside Asia.

An example blacklist policy is as follows:
Blacklist: '!(country=Australia)'
The above example blacklist will blacklist any data path that involves equipment (operators, network, POP, etc.) that is not marked as being in Australia.

An example whitelist policy is as follows:
Whitelist: '(operator=Vodafone OR operator=private) AND proxy.country=Germany'
The above example whitelist will only allow associated devices to connect to Vodafone (in any country) or connect via private LTE, but the proxy in Germany must be used.

Policies can be translated to generate configuration updates. In some implementations, configuration updates are generated for SIMs. For example, configuration updates can be generated to apply policies for changing IMSIs, adding/removing/updating eSIM profiles, and/or performing other configuration updates related to cellular device SIMs. Configuration updates can be delivered to cellular devices using over-the-air (OTA) remote SIM provisioning (RSP) technology.

For example, a configuration update for a SIM can be provided as an OTA update to update the preferred network list. On the SIM card, there is a file that defines the preferred order of networks that the device should connect to. This file is an ordered list of PLMNs and the device shall try to connect in the given order. An OTA update can be sent to update and/or overwrite this file, so that the device can be steered to try the desired network first, increasing the probability of getting the desired network path. As an example, the configuration update can cause the device to prefer T-Mobile strongly over AT&T.

As another example, a configuration update for a SIM card can be provided as an OTA update to update the FPLMN list. On the SIM card, there is a file defining the 'Forbidden PLMN' list. These are PLMNs that the device shall never try. Using OTA, this file can be updated/overwritten, directing the device to never attach to a specific network (or networks). As an example, the customer may want traffic to never go over AT&T, even if it is the only available network.

As another example, a configuration update for a SIM card can be provided to add IMSIs. On a SIM card, there can be several IMSIs (a.k.a. a multi-IMSI profile). Using OTA, IMSIs can be added and removed, and more importantly, the mapping between PLMNs and a chosen IMSI can be updated. As an example, for a specific country, all IMSIs on a device are only respected by undesired networks. A new IMSI can then be provisioned, allowing new or different roaming agreements to be applied, thereby moving traffic to the desired network path.

As another example, a configuration update for a SIM card can be provided to add or remove e-SIM profiles over RSP. As an example, for a specific country, all IMSI(s) on the default SIM profile on an eUICC SIM card are only respected by undesired networks. A new SIM profile can then be provisioned over RSP, allowing new or different roaming agreements to be applied, thereby moving traffic to the desired network path.

In some implementations, configuration updates are generated for HSSs. For example, configuration updates can be generated to apply policies related to inbound and/or outbound data paths. The configuration updates can comprise IMSI steering rules, disconnection rules, reporting rules, and/or other types of configuration updates.

The following are example configuration updates that can be generated for HSSs.

Add or remove allowed APNs—The visited network will only allow SGW sessions based on a whitelist of allowed APNs: Example: Add additional APN "data001".

Add bearer quality parameters per APN—Requested quality parameters can be changed per APN, including bitrate parameters (min, max, average), quality class information (1-9) based on 3GPP specification of traffic type. Example: Set default APN QCI from 9 (low priority internet traffic without guaranteed bit rates) to 1 (voice/video calling with reduced latency and with guaranteed minimum bit rates).

Update IMSI steering rule: Add information that a specific network shall be forbidden with a count, meaning that the network attach is rejected a certain number of times, after which it is accepted. Example: Update containing a new network to steer away from:
action=forbidwithcount, gtprefix=+479988, realm=mnc001.mcc242.3gppnetwork.org, forbidcode=40, maxforbid=4
This would cause all attachment requests from Telenor in Norway (PLMN=24201, GT prefix of +479988xxx) to be rejected with error code 40 (No EPS bearer context activated—UE must perform a new attach procedure) for the first 4 attempts, allowing the attach to succeed on the 5th attempt.

In some implementations, configuration updates are generated for proxies. For example, configuration updates can be generated to apply policies related to inbound and/or outbound data paths. The configuration updates can comprise routing updates, reporting rules, and/or other types of configuration updates.

The following is an example configuration update for a proxy. This example configures the proxy such that a specific set of IMSIs (devices) may only connect from a specific set of PLMNs with a specific IMEI prefix (e.g., it's a Google Nexus 9 tablet) and sets routing information of the PGW:
imsi=313260101001000,313260101001001, 313260101001002 allowedPLMN=313260,24201
imei=86940002*
pgw=pgw01.us-east.somecompany.expeto.io
action=proxy Another example of a configuration update for a proxy is an update that specifies that all traffic must be redirected to another proxy:

imsi=313260101001000
proxy=172.55.44.11
action=redirect

More complex rules can also reference local state and lookups:

imsi=313260101001000
source.whitelist=t-mobile-sgw-ips
location=san-francisco
action=proxy
pgw=172.11.22.33

In this example, 't-mobile-sgw-ips' will be a list of all IP addresses used by t-mobile for the SGW, and any traffic not originating would be reject. Similarly, 'location=san-francisco' would trigger a local function to do a lookup (e.g., using local or remote database) of the cell-id (e.g., from signaling) and validate that the cell-id the traffic is originating from is also within the general area designated as 'san francisco'.

In some implementations, configuration updates are generated for PGWs. For example, configuration updates can be generated to apply policies related to inbound and/or outbound data paths. The configuration updates can comprise routing updates, reporting rules, and/or other types of configuration updates.

The following is an example configuration update for a PGW. This example allows a specific IMSI, gives it a specific fixed IP, and allows connections from two different proxies. Also, this example sets up that this device has a subnet behind it which will be accessible via frame-relay using layer 3 routing.

imsi=313260101001000
proxy=172.11.22.33,172.66.55.44
ipv4=100.64.1.2
girouting=192.168.4.0/24

In this example, reporting is not configured. Instead, all information about every step can be reported respectively by the HLR, proxy and PGW, of which the PGW carries the most information. The PGW would be able to report about which PLMN us used (i.e., visited network), which proxy and PGW are being used, as well as statistics and introspection on the data payload (e.g., byte counts, port numbers, IPs, etc.). The proxy will be able to share part of this information and can also report if any re-directions occurred to ensure the correct path. The HLR would also be able to report if any IMSI steering took place to nudge the device to the correct network. All components can report whether traffic was denied for any reason.

Command and Control Service

In the technologies described herein, data paths can be controlled via a command and control service. The command and control service is a separate entity from the other entities of the cellular network (e.g., the cellular devices, the cellular operators, the IPX, the POPs, the PGWs, and the customer networks. The command and control service manages policies for controlling data paths (e.g., end-to-end data paths between cellular devices and customer networks).

The command and control service can receive policies from users. For example, an administrator (e.g., a user associated with the customer) or another user can configure policies via the command and control service. In some implementations, the command and control service provides an application programming interface (API) for receiving policies (e.g., via software applications running on other systems). The command and control service can also receive policies via a user interface (e.g., a graphical user interface) provided directly by the command and control service (e.g., as a web service).

The command and control service can be implemented by hardware and/or software resources (e.g., in a data center or cloud service). The command and control service can be run by a customer or by a service provider (e.g., a service provider that implements the end-to-end data path control technologies, including the POPs and PGWs).

In some implementations, the command and control service communicates with agents located with (e.g., co-located), or associated with, various entities of the cellular environment. For example, an agent (also called a command and control agent) can be located with each POP. Agents can also be located with PGWs and/or cellular devices. Agents can be implemented using software and/or hardware resources. For example, an agent that is located in a POP can run on computer server resources of the POP (e.g., servers in a data center or cloud environment), which can be the same computer server resources or different computer server resources which implement the HSS and/or proxy.

In some implementations, data path control is implemented by the command and control service via the agents. For example, the command and control service can send (e.g., push) configuration updates to the agents, and the agents can in turn apply the configuration updates to the various entities (e.g., perform local updates). For example, the command and control service can send configuration updates to an agent located in a particular POP. The agent in the particular POP can receive the configuration updates and apply them to the HSS and/or proxy of the particular POP. The agents can also receive and process data from the various entities and communicate results to the command and control service. For example, the agent associated with the particular POP can receive monitoring data from the HSS and/or proxy of the particular POP and send the monitoring data to the command and control service. The agent can also process the monitoring data (e.g., sending results to the command and control service, generating alerts, etc.).

Monitoring and Reporting

In the technologies described herein, monitoring data can be generated by the various entities of the cellular telecommunications environment (e.g., by the HSSs, proxies, PGWs, etc.). The monitoring data can be used in various ways. For example, the monitoring data can be used to report statistics (e.g., usage statistics, such as connection requests and data usage), to generate alerts (e.g., to alert an administrator when a cellular device tries to connect via an unauthorized data path), and for other monitoring and reporting purposes.

Monitoring data can be generated directly by the entities and/or by the command and control service. The entities can also generate monitoring data and send the monitoring data (e.g., as raw data and/or process data) to the command and control service. The command and control service can obtain monitoring data from the entities and process it in the ways described herein (e.g., log or report the data, generate alerts, etc.).

In addition to normal monitoring, that any such system can do, monitoring of the data path and the data users can be performed. For example, reports can be generated showing the complete set of data paths used by one or more devices with associated statistics (e.g., byte counts, sessions, min/max/average session durations, etc.). The customer could use this information to validate and ensure that the policies are correct and working.

Telecommunications Environment for Controlling Data Paths

Figure 1:
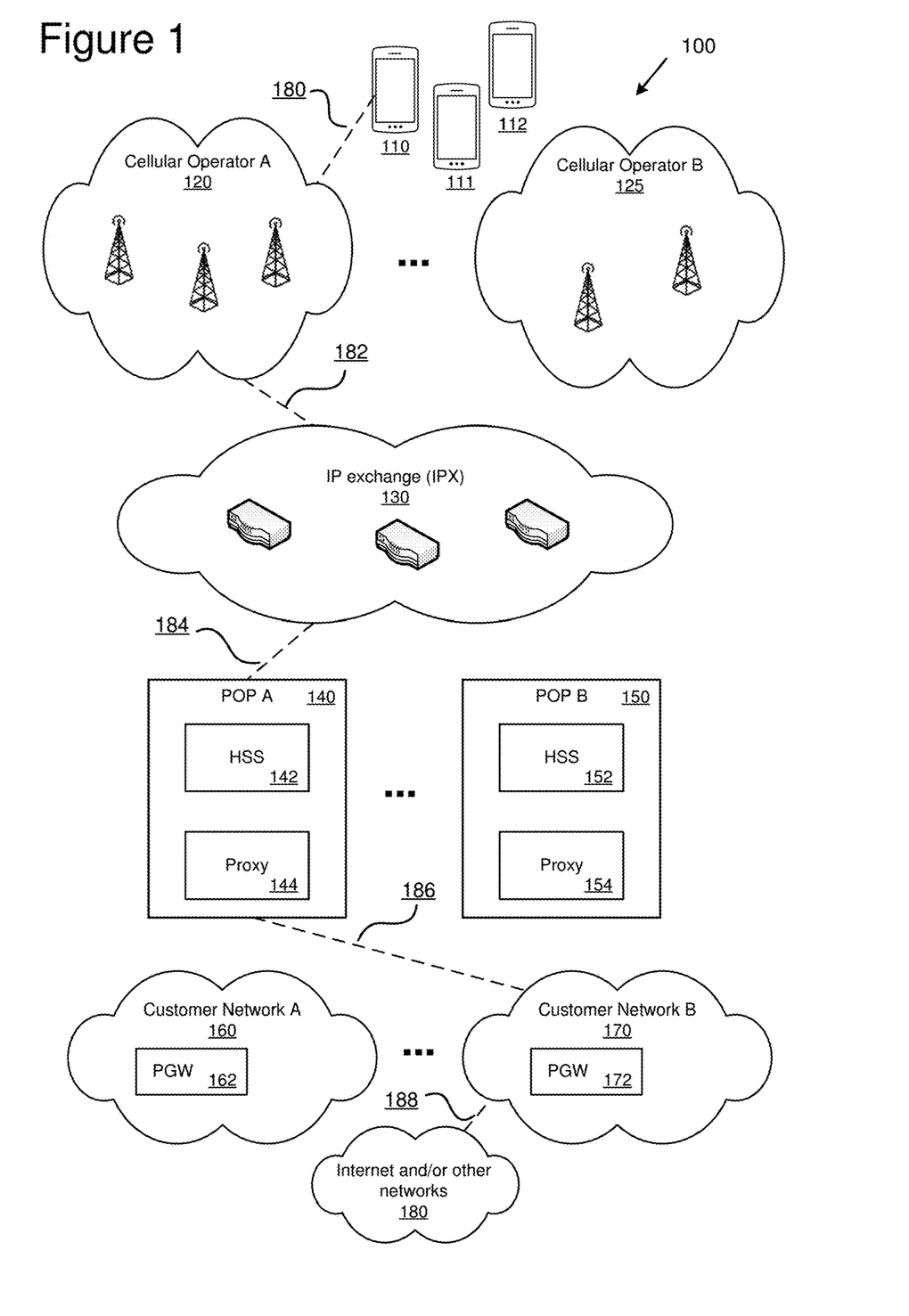
FIG. 1 is a is a diagram depicting an example cellular telecommunications environment.

FIG. 1 is a diagram depicting an example cellular telecommunications environment 100 that can be used for controlling data paths for cellular network data. For example, using the technologies described herein, the end-to-end data path for cellular network data can be controlled or managed.

The example cellular telecommunications environment 100 includes a number of cellular devices 110-112. The cellular devices 110-112 can be any type of device (e.g., computing device) that is associated with a cellular radio (e.g., a smart phone, a laptop computer, a tablet, a sensor device, an Internet of things (IoT) device, and/or another type of computing device that has a cellular radio). The cellular devices 110-112 can also be associated with other types of objects (e.g., a shipping container that has an attached or integrated cellular device, which can be used to track its location, report status, etc.). The cellular devices 110-112 connect to cellular operators (also referred to as mobile operators).

For example, in order for cellular device 110 to communicate with a destination device on the Internet (e.g., a web server or other Internet service), the cellular device has to go through a sequence of cellular network operations that can involve various devices within the environment. For example, the cellular device may have to first establish a cellular network connection with a cellular operator, then authenticate with an HSS, then initiate a data session with a proxy, then establish the data session with a PGW, and finally communicate data with the destination device on the Internet.

In the example cellular telecommunications environment 100, there are two cellular operators depicted, cellular operator A 120 and cellular operator B 125. For example, cellular operator A 120 could be AT&T and cellular operator B 125 could be T-Mobile. Cellular operator A 120 and cellular operator B 125 could be located in different countries (e.g., cellular operator A 120 could be AT&T in the United States and cellular operator B 125 could be Deutsche Telekom® in Germany) While only two example cellular operators are depicted for ease of illustration, the example cellular telecommunications environment 100 can include any number of cellular operators, which can be located in various different countries.

The example cellular telecommunications environment 100 depicts an IP exchange (IPX) 130. The IPX 130 is a telecommunications interconnection network for exchanging cellular network traffic between customers of different cellular operators. In other words, the IPX 130 is a private backbone serving cellular operators. The IPX 130 is different than, and separate from, the Internet.

In the example cellular telecommunications environment 100, there are two point of presence (POP) entities, POP A 140 and POP B 150. Each POP comprises an HSS and a proxy. Specifically, POP A 140 includes HSS 142 and proxy 144, and POP B 150 includes HSS 152 and proxy 154. POP A 140 and POP B 150 could be located in the same country or in different countries. While only two POPs are depicted for ease of illustration, the example cellular telecommunications environment 100 can include any number of POPs (e.g., one or more POPs), which can be located in various different countries.

In the example cellular telecommunications environment 100, there are two customer networks, customer network A 160 and customer network B 170. A customer network can comprise local area networks, wide area networks, and/or other networks of the customer. A customer can be a particular business or organization. Customer network A 160 and customer network B 170 could be customer networks of the same business or organization (e.g., located in different geographical locations, such as different data centers in different countries or different continents). Customer network A 160 and customer network B 170 could also be customer networks of different businesses or organizations (e.g., located in the same geographical location or different geographical locations). While only two example customer networks are depicted for ease of illustration, the example cellular telecommunications environment 100 can include any number of customer networks (associated with any number of customers), which can be located in various different countries.

Each customer network comprises a PGW. Specifically, customer network A 160 includes PGW 162, and customer network B 170 includes PGW 172. In some implementations, the PGWs are located outside the customer networks. For example, the PGWs can be located in the PoPs, but connected to their respective customer networks.

The data paths between the cellular devices (e.g., cellular devices 110-112) and the various entities of the cellular telecommunications environment 100 can be controlled using the technologies described herein. The data paths can be controlled at a number of points within the network. The following describes how the data path can be controlled beginning with cellular device 110.

In some implementations, the data path between the cellular device and the cellular operator is controlled. For example, the technologies described in the "Cellular Operator Selection Stage" section can be used to control which cellular operator the cellular device connects to. As depicted in the cellular telecommunications environment 100, cellular device 110 has connected to cellular operator A 120, as shown by the data path 180. For example, cellular device 110 can be programmed with an IMSI associated with cellular operator A 120, or with a selection preference that prefers cellular operator A 120 over cellular operator B 125.

In some implementations, the data path (e.g., the inbound signaling data path from the cellular device to the HSS) is controlled by the HSS. For example, the technologies described in the "HSS Stage" section can be used to control which cellular operator the cellular device connects to and/or which POP the cellular device connects to. As depicted in the cellular telecommunications environment 100, cellular device 110 has connected, via portions of the data path 180, 182, and 184, to HSS 142. At this point, HSS 142 can authorize the connection or perform another action. For example, if cellular device 110 is not authorized to connect via the data path (e.g., if cellular device 110 is not authorized to establish a data path via cellular operator A 120 and/or to POP A 140), then HSS 142 can deny the connection. The HSS 142 can also perform actions such as sending configuration settings to the cellular device 110 to change its IMSI and/or change its cellular operator selection preference (e.g., causing the cellular device 110 to switch its data path to connect via another cellular operator, such as cellular operator B 125).

In an illustrated example that references FIG. 1, POP A 140 can be located in Australia and POP B 150 can be located in the U.S., and the policy can specify that traffic cannot go outside the U.S. In this example, proxy 144 (part of POP A 140) can detect the problem and perform a redirection to proxy 154 (part of POP B 150). Proxy 154 can then use the policy (e.g., other configuration parameters) to proxy or redirect to the correct PGW. Even though a very small amount of signaling would traverse POP A 140 (located in Australia in this example), this signaling would occur before the first data packet (before the first payload). Therefore, no data packets would travel outside the U.S.

In some implementations, the data path is controlled by the proxy. For example, the technologies described in the "Proxy Stage" section can be used to control inbound data path (from the cellular device to the proxy) and/or the outbound data path (from the proxy to the PGW). For example, the proxy 144 can control whether the data path is routed to PGW 162 or PGW 172. The proxy 144 can make the routing decision based on various criteria (e.g., based on metadata). For example, if customer network A 160 and customer network B 170 are customer networks of the same business located in different countries (e.g., in the U.S. and Australia, respectively), then proxy 144 can direct the data path based on a policy (e.g., if the policy requires data to remain in the U.S., then the data path can be routed to PGW 162 of customer network A 160 which is located in the U.S.).

In some implementations, the data path is controlled by the PGW. For example, the technologies described in the "PGW Stage" section can be used to control inbound data path (from the cellular device to the PGW and/or the outbound data path (from the PGW to the destination device). For example, PGW 162 can refuse a data path connection from a given POP (e.g., if POP A 140 is located in a restricted country based on a policy associated with cellular device 110). The PGW can also control the outbound data path. For example, the PGW can restrict the destination devices that the data path is allowed to establish connections with (e.g., by IP address subnet, by destination network, etc.). For example, the PGW 172 can restrict the data path to destinations within customer network B 170 and/or to destinations within the Internet and/or other networks 180.

In some implementation, controlling the end-to-end data path comprises controlling each of the cellular operator selection stage, HSS stage, proxy stage, and PGW stage. For example, the end-to-end data path between cellular device 110 and customer network B 170 can be controlled, which comprises data path segments 180, 182, 184, and 186. In some implementations, the end-to-end data path also includes the data path segment to the destination in the customer network or to the destination in other networks (e.g., data path segment 188).

In some implementations, policies are applied by the various entities as follows.

For the HSS, the policy is applied based on IMSI or MSISDN.

For the Proxy, the policy is evaluated as a ruleset for every single session establishment.

For the PGW, some parts of the policy are applied as configuration per PGW instance, other parts of the policy are evaluated as a ruleset (similar to Proxy) for every single session establishment.

Figure 2:
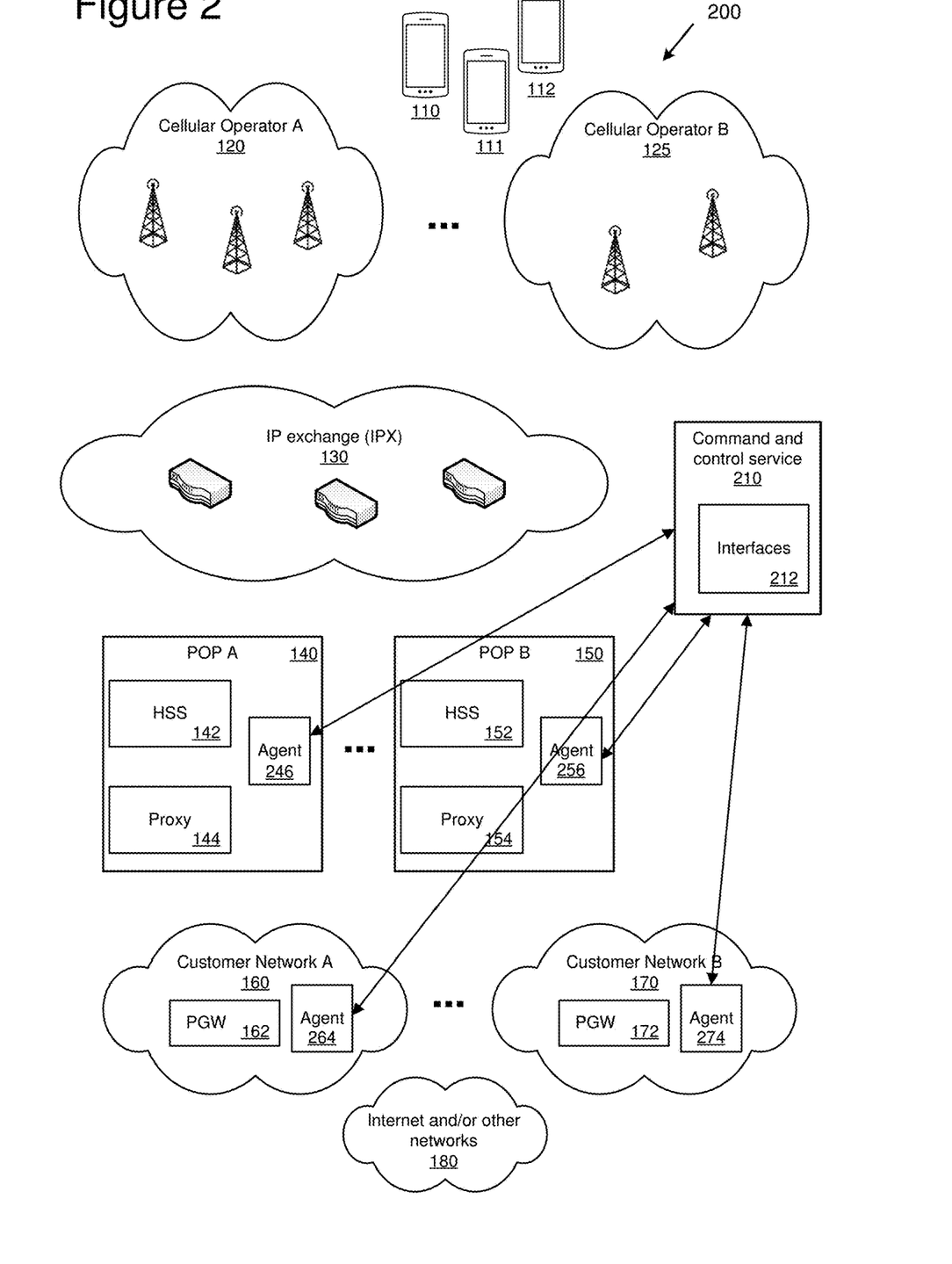
FIG. 2 is a diagram depicting an example cellular telecommunications environment, including a command and control service.

FIG. 2 is a diagram depicting an example cellular telecommunications environment 200 that can be used for controlling data paths for cellular network data. The example cellular telecommunications environment 200 is similar to the example cellular telecommunications environment 100, with the addition of a command and control service 210.

The command control service 210 is a service that provides for management of the data paths. The command and control service 210 includes interfaces 212 (e.g., user interfaces, such as graphical user interfaces (GUIs), APIs, and/or other types of computer user interfaces) that allow users and/or other computer services to manage the data paths. For example, users can access the command and control service 210 via the interfaces 212 to create or modify policies controlling the data paths.

The command and control service 210 communicates configuration updates to agents that are located with (e.g., co-located) or associated with the various entities of the network. For example, the command and control service 210 can generate configuration updates from the received policies, and transmit the configuration updates to agents 246, 256, 264, and/or 274. For example, if the command and control service 210 has a configuration update for HSS 142, then the command and control service 210 can send the configuration update to agent 246. From the point of view of the agent, agent 246 can receive the configuration update from the command and control service 210 and configure HSS 142 with the configuration update.

The agents can also send monitoring and reporting data back to the command and control service 210. For example, the agents can receive monitoring data from the various entities (e.g., HSS, proxy, PGW, etc.) and send the data back to the command and control service 210.

Methods for Controlling Data Paths within Cellular Telecommunications Environments In the technologies described herein, methods can be provided for controlling data paths for cellular network data within cellular telecommunications environments.

Figure 3:
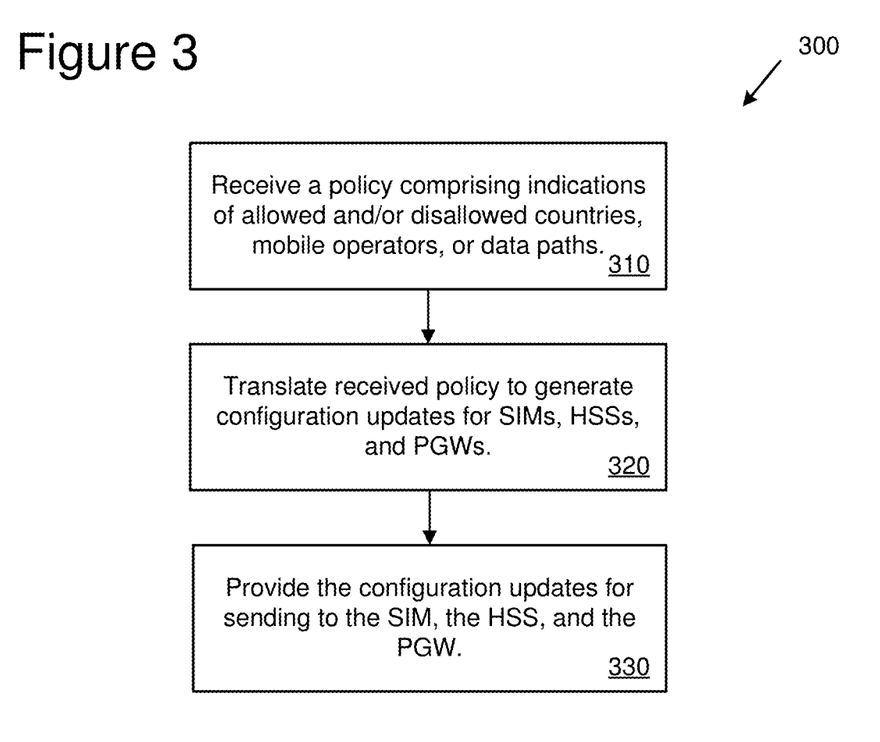
FIG. 3 is a flowchart of an example process for controlling a data path within a cellular telecommunications environment.

FIG. 3 is a flowchart depicting an example method 300 for controlling a data path within a cellular telecommunications environment. At 310, a policy is received comprising indications of allowed and/or disallowed countries, mobile operators and/or data paths. For example, the policy can be received by a command and control service or by another entity of the cellular telecommunications environment (e.g., HSS, proxy, PGW, etc.).

At 320, the received policy is translated to generate configuration updates. The configuration updates can be generated for one or more SIMs, HSSs, PGWs, and/or other entities. The translation can be performed by a command and control service.

At 330, the configuration updates are provided for sending to the SIMs, HSSs, PGWs, and/or other entities. For example, the command and control service can send the configuration updates to agents associated with the entities. The configuration updates are applied at their respective entities (e.g., SIMs, HSSs, and PGWs) to implement the policy.

Figure 4:
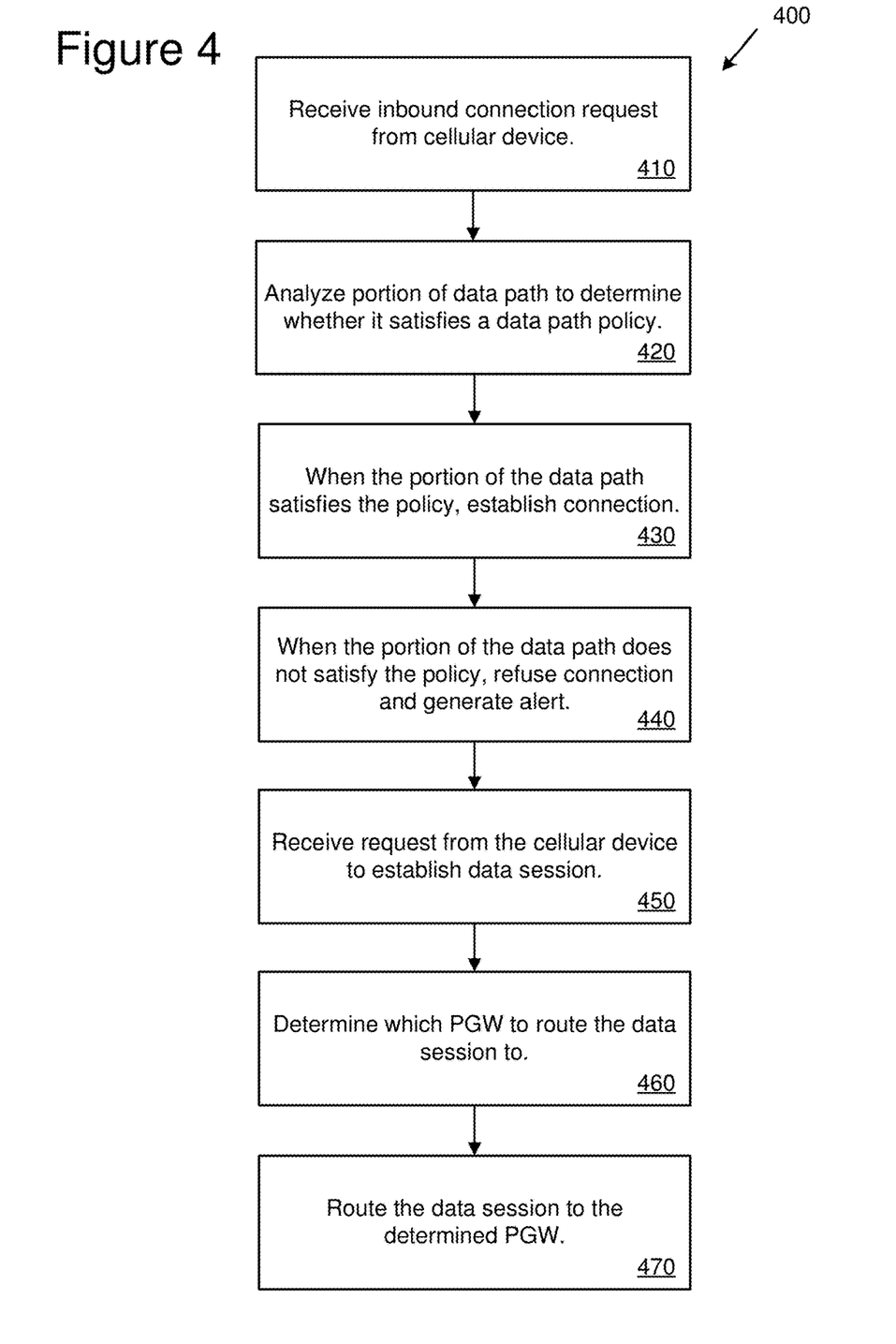
FIG. 4 is a flowchart of an example process for controlling data paths within a cellular telecommunications environment.

FIG. 4 is a flowchart of an example method 400 for controlling a data path within a cellular telecommunications environment. At 410, an inbound connection request is received from a cellular device. At 440, a portion of the data path is analyzed to determine whether it satisfies a data policy. For example, the portion of the data path can be an inbound signaling portion from the cellular device to a cellular operator and/or from the cellular device to an HSS.

At 430, when the portion of the data path satisfies the policy (e.g., when the portion of the path to the cellular operator is allowed according to the policy and/or the portion of the path to the HSS is allowed according to the policy), a connection is established with the cellular device. For example, the HSS establishes (e.g., allows or authorizes) the connection with the cellular device.

At 440, when the portion of the data path does not satisfy the policy, the connection request from the cellular device is refused and an alert is generated. For example, the alert can be sent (e.g., as monitoring data) to a command and control service. The command and control service can report the alert (e.g., save it to a log file, send a message to an administrator, etc.).

The operations depicted at 410, 420, 430, and 440 can be performed by an HSS.

At 450, a request is received from the cellular device to establish a data session. Responsive to the request to establish the data session, at 460 a determination is made to route the data session to a specific PGW selected from among multiple possible PGWs (e.g., located in different countries). For example, the data session can be routed to a PGW located in a country that satisfies the policy. At 470, the data session is routed to the determined PGW.

The operations depicted at 450, 460, and 470 can be performed by a proxy. In some implementations, the operations depicted at 450, 460, and 470 are performed when the portion of the data path satisfies the policy, as determined at 430.

Computing Systems

Figure 5:
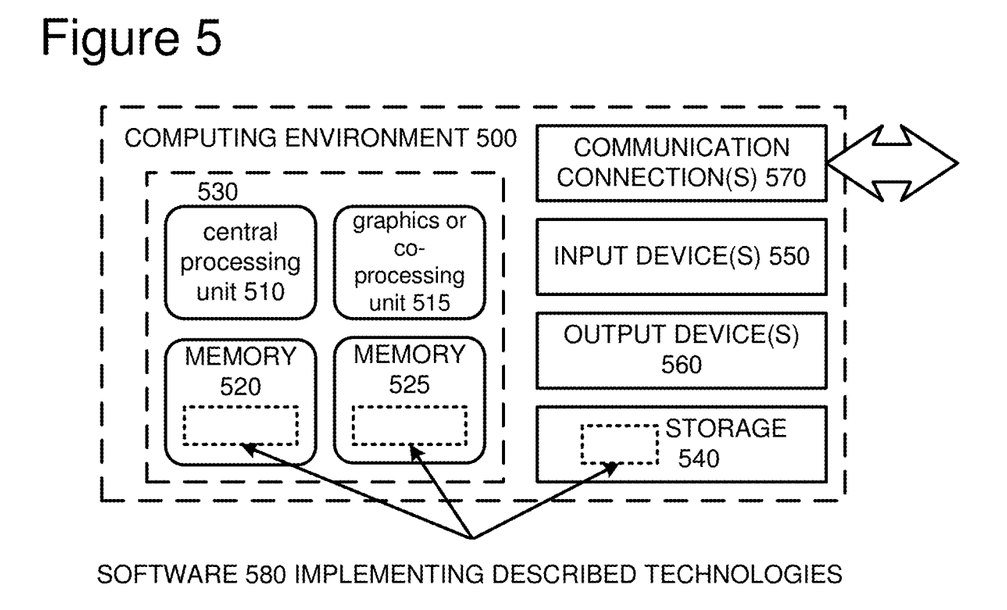
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 6:
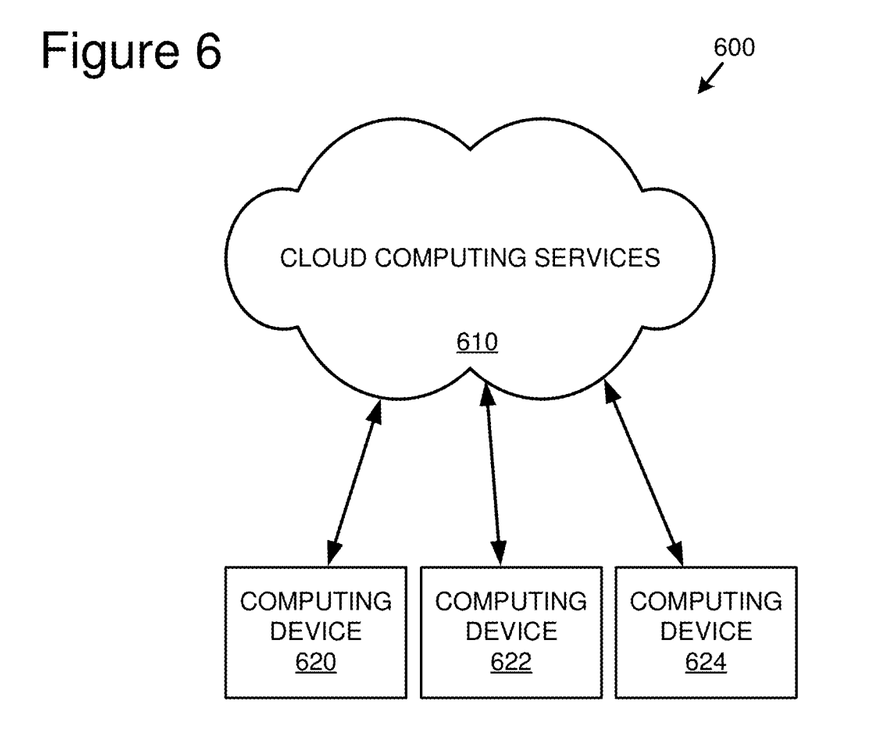
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, database resources, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for controlling a data path within a cellular telecommunications environment, the method comprising:
   receiving a policy, wherein the policy comprises:
     indications of allowed and/or disallowed countries;
     indications of allowed and/or disallowed mobile operators; and
     indications of allowed and/or disallowed data paths;
   translating the received policy to generate configuration updates, comprising:
     determining a configuration update for a SIM;
     determining a configuration update for an HSS; and
     determining a configuration update for a PGW;
   providing the configuration updates for sending to the SIM, the HSS, and the PGW;
   wherein a cellular device uses the configuration update to configure the SIM associated with the cellular device to manage connections to countries and mobile operators according to the policy;
   wherein the HSS uses the configuration update to configure the HSS to manage the data path that will be used by the cellular device according to the policy; and
   wherein the PGW uses the configuration update to configure the PGW to manage the data path that will be used by the cellular device according to the policy.

2. The method of claim 1, wherein the cellular device selects a particular IMSI, from a set of available IMSIs, to use for the cellular device based on the configuration update for the SIM associated with the cellular device.

3. The method of claim 2, wherein the SIM supports multiple profiles.

4. The method of claim 1, wherein the HSS manages the data path by enforcing an inbound signaling portion of the data path from the cellular device to the HSS, comprising enforcing the allowed and/or disallowed operators.

5. The method of claim 1, wherein the PGW manages the data path by enforcing an inbound portion of the data path from the cellular device to the PGW, and by enforcing an outbound portion of the data path from the PGW to a destination device, wherein enforcement by the PGW comprises enforcement of the allowed and/or disallowed countries.

6. The method of claim 1, wherein the policy determines which HSS, of a plurality of HSSs, will be in the data path based at least in part on the configuration update for the SIM.

7. The method of claim 6, wherein the HSS is located in a different country from at least one other HSS of the plurality of HSSs.

8. The method of claim 1, wherein the data path is an end-to-end data path between the cellular device and a destination device in a customer network.

9. The method of claim 1, further comprising:
translating the received policy to generate configuration updates, comprising:
determining operations for configuring a proxy;
wherein the proxy uses the configuration update to configure the proxy to manage the data path that will be used by the cellular device according to the policy.

10. The method of claim 9, wherein the HSS and the proxy are located in a point of presence (POP).

11. The method of claim 1, further comprising:
receiving reporting data from one or more of the HSS, the PGW, or the proxy; and
generating one or more alerts based on the received reporting data.

12. One or more computing devices comprising:
processors; and
memory;
the one or more computing devices configured, via computer-executable instructions, to perform operations for controlling data paths within a cellular telecommunications environment, the operations comprising:
receiving a policy, wherein the policy comprises:
indications of allowed and/or disallowed countries;
indications of allowed and/or disallowed mobile operators; and
indications of allowed and/or disallowed data paths;
translating the received policy to generate configuration updates, comprising:
determining configuration updates for one or more subscriber identity modules (SIMs);
determining configuration updates for a plurality of home subscriber servers (HSSs) located in a plurality of different countries; and
determining configuration updates for a plurality of packet data network gateways (PGWs);
providing the configuration updates for sending to the SIMs, the HSSs, and the PGWs;
wherein cellular devices use the configuration updates to configure the SIMs associated with the cellular devices to manage connections to countries and mobile operators according to the policy;
wherein the HSSs use the configuration updates to configure the HSSs to manage the data paths that will be used by the cellular devices according to the policy; and
wherein the PGWs use the configuration updates to configure the PGWs to manage the data paths that will be used by the cellular devices according to the policy.

13. The one or more computing devices of claim 12, wherein the HSSs manage the data paths by enforcing inbound signaling portions of the data paths from the cellular devices to the HSSs, comprising enforcing the allowed and/or disallowed operators.

14. The one or more computing devices of claim 12, wherein the PGWS manage the data paths by enforcing inbound portions of the data paths from the cellular devices to the PGWs, and by enforcing outbound portions of the data paths from the PGWs to destination devices, wherein enforcement by the PGWs comprises enforcement of the allowed and/or disallowed countries.

15. The one or more computing devices of claim 12, wherein the data paths are end-to-end data paths between the cellular devices and destination devices in customer networks.

16. The one or more computing devices of claim 12, the operations further comprising:
translating the received policy to generate configuration updates, comprising:
determining operations for configuring a plurality of proxies;
wherein the proxies use the configuration update to configure the proxies to manage the data paths that will be used by the cellular devices according to the policy.

17. The one or more computing devices of claim 16, the operations further comprising:
receiving reporting data from the HSSs, the proxies, or the PGWs; and
generating one or more alerts based on the received reporting data.

18. One or more non-transitory computer-readable storage media storing computer-executable instructions for execution on one or more computing devices to perform operations for controlling a data path within a cellular telecommunications environment, the operations comprising:
at an HSS:
receiving an inbound connection request from a cellular device;
analyzing a portion of the data path for the inbound signaling to determine whether it satisfies a data path policy;
when the portion of the data path for the inbound signaling satisfies the data path policy, establishing a connection with the cellular device; and
when the portion of the data path for the inbound signaling does not satisfy the data path policy:
refusing the connection request from the cellular device; and
generating an alert indicating the refused connection request;
at a proxy:
receiving a request from the cellular device to establish a data session;
responsive to the request from the cellular device to establish the data session, determining which PGW, from a plurality of PGWs, to route the data session to, wherein the determination is based at least in part upon which countries the PGWs are located in; and
routing the data session to the determined PGW.

19. The one or more non-transitory computer-readable storage media of claim 18, wherein the data path policy is received as a configuration update from a command and control service, and wherein the alert is sent to a command and control service.

20. The one or more non-transitory computer-readable storage media of claim 18, wherein the HSS and the proxy send monitoring data for the data path to a command and control service.

\* \* \* \* \*